United States Patent [19]
Rudloff

[11] Patent Number: 5,598,905
[45] Date of Patent: Feb. 4, 1997

[54] METHOD OF MAKING A SHOCK ABSORBER AND A SHOCK ABSORBER MADE BY THE METHOD

[75] Inventor: Werner Rudloff, Schraudenbach, Germany

[73] Assignee: Fichtel & Sachs AG, Schweinfurt, Germany

[21] Appl. No.: 330,269

[22] Filed: Oct. 27, 1994

[30] Foreign Application Priority Data

Nov. 2, 1993 [DE] Germany ............................ 43 37 306.2
Mar. 4, 1994 [DE] Germany ............................ 44 07 261.9

[51] Int. Cl.⁶ ..................................................... F16F 9/32
[52] U.S. Cl. .................. 188/322.16; 29/513; 188/322.11
[58] Field of Search ........................ 29/510, 513; 72/367, 72/369; 188/322.11, 322.16–322.19, 299

[56] References Cited

U.S. PATENT DOCUMENTS

| | | | |
|---|---|---|---|
| 3,643,322 | 2/1972 | Gerstle ........................................ | 29/482 |
| 4,625,539 | 12/1986 | Brooks et al. ............................. | 72/402 |
| 4,884,665 | 12/1989 | Parker et al. ........................ | 188/322.17 |
| 5,163,224 | 11/1992 | Wells et al. ................................ | 29/513 |
| 5,462,142 | 10/1995 | Handke et al. .......................... | 188/299 |

FOREIGN PATENT DOCUMENTS

| | | | |
|---|---|---|---|
| 0271328 | 6/1988 | European Pat. Off. .......... | 188/322.17 |
| 2358214 | 3/1978 | France ..................................... | 29/513 |
| 67348 | 5/1892 | Germany . | |
| 1923927 | 5/1965 | Germany . | |
| 8311750 | 12/1983 | Germany . | |
| 3423598 | 1/1986 | Germany . | |
| 4112956 | 10/1992 | Germany . | |
| 0662912 | 12/1951 | United Kingdom ....................... | 72/48 |
| 2243898 | 11/1991 | United Kingdom ............. | 188/322.17 |

*Primary Examiner*—Robert J. Oberleitner
*Assistant Examiner*—Chris Schwartz
*Attorney, Agent, or Firm*—Nils H. Ljungman and Associates

[57] ABSTRACT

A piston-cylinder unit, in particular a shock absorber, which comprises a cylinder tube in which a piston rod is located so that the piston rod can move axially, is disclosed. The piston rod is guided by a piston rod guide with a seal which closes the cylinder tube, whereby a closing tool beads an edge which projects beyond the piston rod guide. The cylinder tube has an edge in the shape of a truncated cone, which edge encircles the piston rod guide, and which edge is divided into individual truncated cone surfaces by means of partial closing surfaces.

20 Claims, 5 Drawing Sheets

METHOD OF MAKING A SHOCK ABSORBER AND A SHOCK ABSORBER MADE BY THE METHOD

BACKGROUND OF THE INVENTION

1. Field of the Invention

The present invention relates to a process for closing a piston-cylinder unit, in particular a shock absorber. Such a piston-cylinder unit generally includes a cylinder tube in which there is an axially movable piston rod, whereby the piston rod is guided by means of a piston rod guide having a seal which closes the cylinder tube. A closing tool can preferably be used to bead an edge of the cylinder tube, which edge projects beyond the piston rod guide so that the bead can hold the piston rod guide in the cylinder tube.

2. Background Information

German Patent Application No. 41 12 956 discloses a process for closing a shock absorber in which the edge of the cylinder tube wall is beaded and rolled flat by means of rotating and pivoting rollers. The limits of this application are reached precisely with small cylinder tube diameters and rather large wall thicknesses, since the axial forces necessary for rolling are typically on a very high level.

Federal Republic of Germany Utility Model NO. G 83 11 750 discloses a shock absorber in which the cylinder tube exhibits reductions of its cross-section which make possible a partial beading of the edges of the cylinder tube by means of radially adjustable closing tools or dies. The reduction in the cross section entails a significant reduction in the force which can be applied, which essentially can only be compensated by means of an even greater wall thickness, so that the actual cylinder tube is over-sized. Tests performed on cylinder tubes without reductions in the cross-section revealed unacceptable cracks at the transition points from the partial beading of the edges to the adjacent wall sections of the cylinder tube.

OBJECT OF THE INVENTION

The object of the present invention is to develop a piston-cylinder unit and a closing process for closing a piston-cylinder unit, by means of which process it is possible to close the piston-cylinder unit essentially without cracking, regardless of the dimensions of the cylinder tube.

SUMMARY OF THE INVENTION

The present invention teaches that this object van be accomplished if the cylinder tube preferably has an encircling edge in the shape of a truncated cone, and if the edge is generally divided into individual truncated cone surfaces by means of partial closing surfaces.

One advantage of the method in accordance with the present invention is that essentially no cracking problems occur. In addition to the closing surfaces, the truncated cone is also capable of absorbing axial forces which occur during the operation of the shock absorber.

In contrast to the methods disclosed in German Patent Application No. 41 12 956 and in Federal Republic of Germany Utility Model No. G 83 11 750, the truncated cone can advantageously form a sealing edge which can preferably encircle the piston rod guide. In principle, a sealing edge can be sealed relatively easily, or put another way, a sealing edge can provide a particularly good seal because it has essentially no irregularities which can result in leaks. Because of the truncated cone, there are also essentially no tolerance problems, e.g. on a two-tube shock absorber with a pressure tube on which the piston rod guide is supported, so that adjustments can be made to take length tolerances into account. The sealing edge can preferably shift axially on the cylinder tube, preferably as a function of the length of the pressure tube.

The present invention also teaches that there can be transitions between the closing surfaces and the individual truncated cone surfaces. The transitions can preferably provide a high degree of reinforcement for the closing of the piston-cylinder unit.

In order to provide sufficient strength, the present invention teaches that the cylinder tube advantageously has an essentially constant wall thickness. The manufacture of the cylinder tube can thus be simplified, since essentially no reductions of wall thickness or other processing steps are necessary.

in manufacturing a piston-cylinder unit of the type described above, a conical tool can preferably be used to transform the edge of the cylinder tube into a truncated cone, and at least one beading die can then preferably be driven in so that partial closing surfaces can be created.

The cracking problems experienced with similar processes of the past essentially no longer occur with the process in accordance with the present invention. Likewise, the axial shaping forces which must be applied can be reduced to an acceptable level without adversely affecting either the seal or the level of forces which the seal is capable of withstanding.

For particularly difficult dimensions of the cylinder tube, in particular the dimensions of the edge of the cylinder tube, it is advantageous if the edge of the cylinder tube is annealed in a prior process step. The fluidity or flexibility of the material can thereby be increased so that the forces required to shape the material can be reduced accordingly.

It has been found to be particularly advantageous if the conical tool is an axially adjustable bell, the shaping surface of which tool preferably has a conical contour. As a result of this design of the tool, it is possible to avoid the problems relating to the shoulder disclosed in German Patent Application No. 41 12 956, so that greater tolerances of the edge have essentially no significant influence on the quality of the closing of the piston-cylinder unit.

The above discussed embodiments of the present invention will be described further hereinbelow with reference to the accompanying figures. When the word "invention" is used in this specification, the word "invention" includes "inventions", that is, the plural of "invention" By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a shock absorber, such as for a motor vehicle, the shock absorber comprising: a cylinder defining a chamber therein, the cylinder containing a damping fluid; a piston rod sealingly projecting into the cylinder and being axially displaceable within the cylinder, the piston rod having a longitudinal axis; a piston being attached to the piston rod, the piston being slidably disposed within the cylinder to sealingly divide the chamber into first and second chambers; means for permitting fluid communication between the first chamber and the second chamber; a first end and a second end; the cylinder being disposed between the first end and the second end; the first end comprising first means for connecting the shock absorber to a first body; the second end comprising second means for connecting the shock absorber to a second body; the cylinder comprising: a first end and a second end, the piston rod sealingly projecting into the first end of the cylinder; means for closing the first end of the cylinder; the closing means comprising a portion of the first end of the cylinder; the closing means having been formed by the following steps: bending the portion of the first end of the cylinder towards the piston rod to form a substantially conical portion, the conical portion having a surface which lies on a truncated cone; further bending portions of the substantially conical portion to form a first plurality of projections and a second plurality of projections, each one of the first plurality of projections being bent to be oriented substantially perpendicular to the longitudinal axis of the piston rod; and each one of the second plurality of projections being disposed between adjacent ones of the first plurality of projections.

Another aspect of the invention resides broadly in a shock absorber, such as for a motor vehicle., the shock absorber comprising: a cylinder defining a chamber therein, the cylinder containing a damping fluid; a piston rod sealingly projecting into the cylinder and being axially displaceable within the cylinder, the piston rod having a longitudinal axis; a piston being attached to the piston rod, the piston being slidably disposed within the cylinder to sealingly divide the chamber into first and second chambers; means for permitting fluid communication between the first chamber and the second chamber; a first end and a second end; the cylinder being disposed between the first end and the second end; the first end comprising first means for connecting the shock absorber to a first body; the second end comprising second means for connecting the shock absorber to a second body; the cylinder comprising: a first end and a second end, the piston rod sealingly projecting into the first end of the cylinder; means for closing the first end of the cylinder; the closing means comprising a portion of the first end of the cylinder; the portion of the first end of the cylinder comprising a first plurality of projections, each one of the first plurality of projections being oriented to extend towards the piston rod and substantially perpendicular to the longitudinal axis of the piston rod; a second plurality of projections, each one of the second plurality of projections having a surface which lies on a truncated cone; and each one of the second plurality of projections being disposed between adjacent ones of the first plurality of projections.

BRIEF DESCRIPTION OF THE DRAWINGS

The present invention is described in greater detail below with reference to the accompanying drawings, in which.

DESCRIPTION OF THE PREFERRED EMBODIMENT

Figure 1:
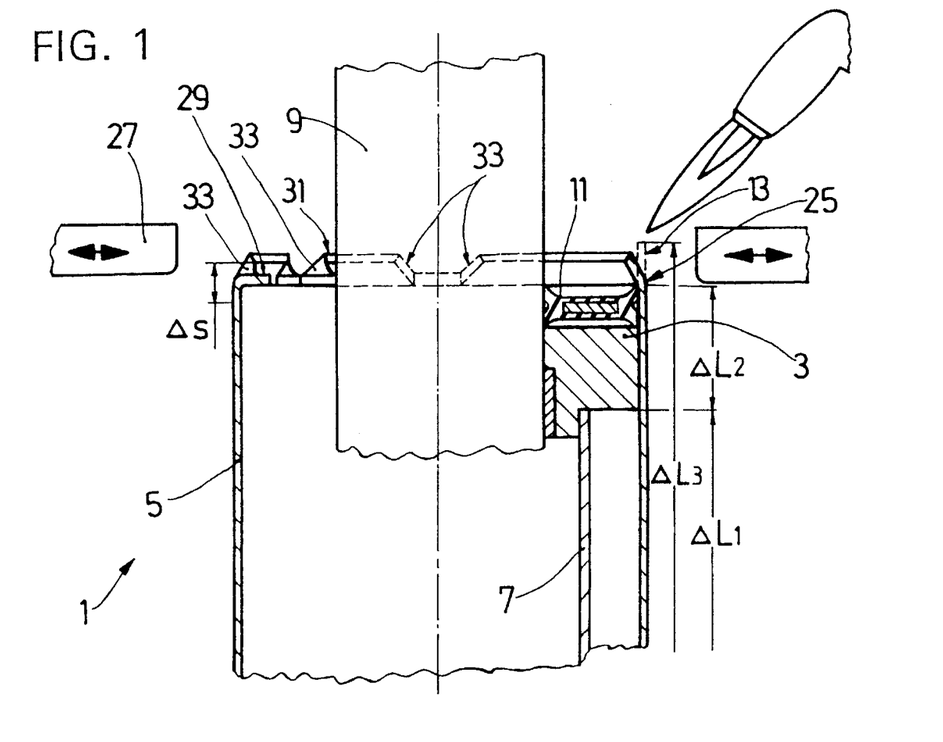
FIG. 1 shows an upper portion of a piston-cylinder unit.

FIG. 1 shows the upper portion of a piston-cylinder unit 1 which can preferably be designed as a two-tube shock absorber having a cylinder 5 and a pressure tube 7. A more detailed description of a shook absorber is provided herebelow with respect to FIGS. 3 and 4. In the depicted embodiment of FIG. 1, a piston rod guide 3 can preferably be provided to close the cylinder 5 and the pressure tube 7. The piston rod guide 3 can also preferably center a piston rod 9. The piston-cylinder unit 1 can preferably be sealed by means of a piston rod gasket In accordance with one embodiment of the present invention, it should be noted that the gasket 11 and the piston rod guide 3 are essentially only shown in partial section in FIGS. 1 and 1a, and that the piston rod gasket 11 and the piston rod guide 3 preferably extend about the piston rod 9.

When fully assembled, an open edge 13 of the cylinder tube 5 can preferably extend axially beyond the piston rod guide 3. The cylinder 5 can preferably have an essentially constant wall thickness. The assembled piston-cylinder unit 1 can then be placed in a fixture for "bending" the edge 13 to hold the piston rod guide 3.

Figure 1A:
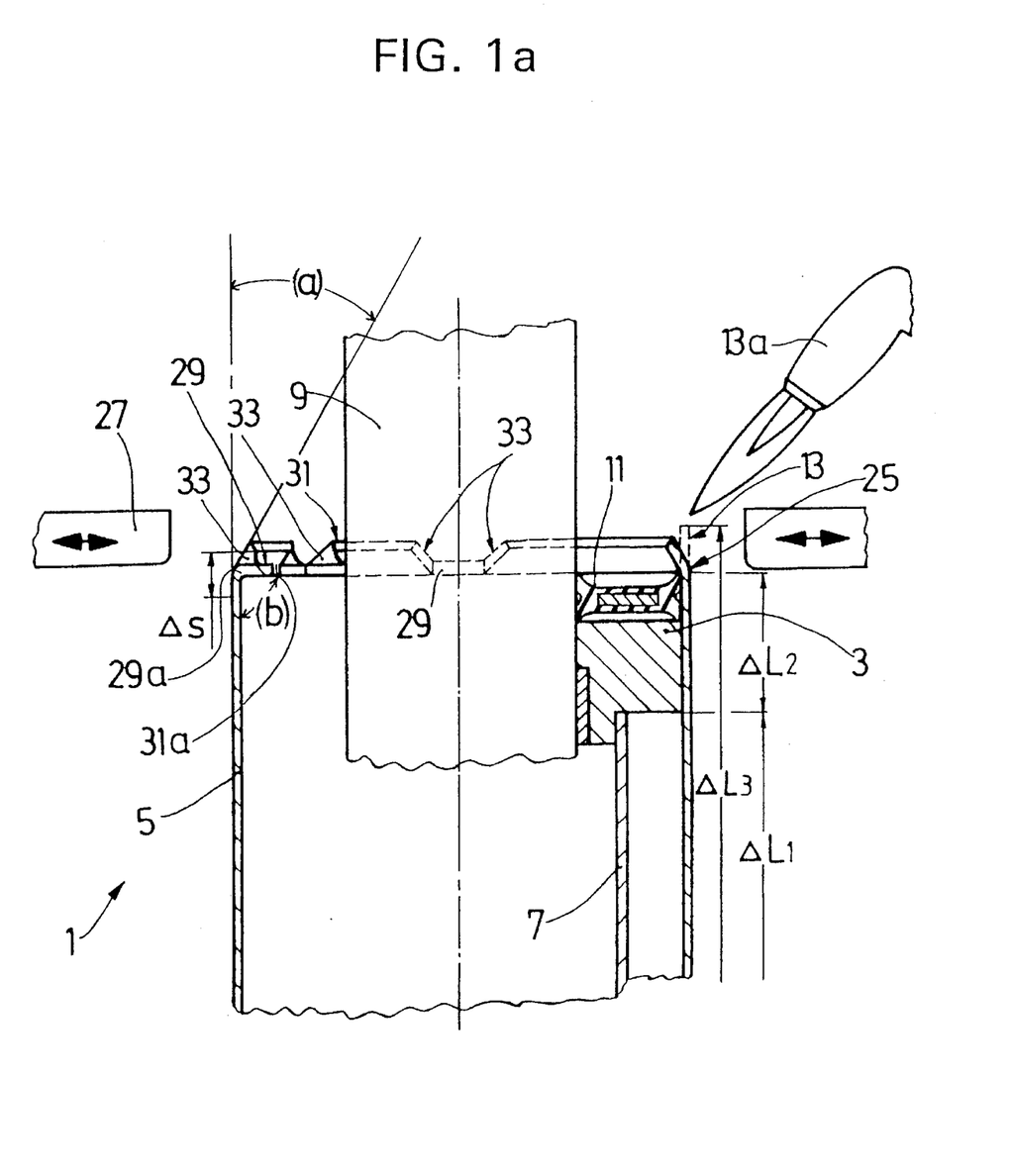
FIG. 1a shows a more detailed view of the piston-cylinder unit of FIG. 1.
Figure 2:
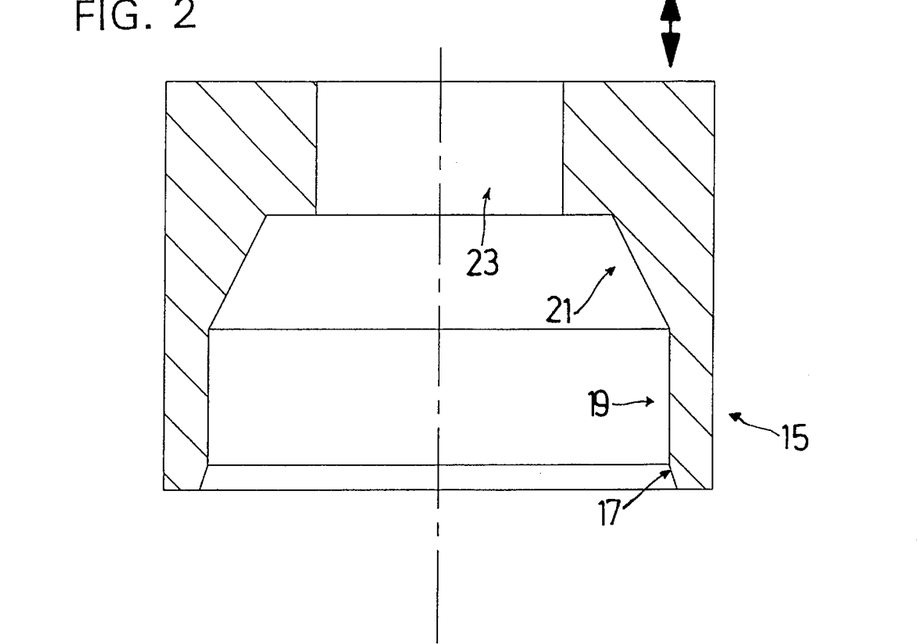
FIG. 2 shows a cross-section of a closing tool in a position axially above the piston-cylinder unit of FIG. 1.

In a first process step, for bending the edge 13 to close the piston-cylinder unit 1, a tool 15 having a generally conical shape, as shown in cross-section in FIG. 2, can be applied to the piston-cylinder unit 1. This conical tool 15, in accordance with at least one embodiment of the present invention, can preferably transform essentially the entire edge 13 having a substantially cylindrical shape, into the general shape of a truncated cone 14 (see FIG. 1a). In accordance with one embodiment of the present invention, the edge 13 can be transformed into a truncated cone 14 by bending the edge 13 to an angle (a). Angle (a) can be an angle of about 30°. Of course, angle (a) could conceivably be varied, and thus other angles are possible within the scope of the present invention. The conical tool 15 can preferably have a bevelled section 17 which bevelled Section 17 can aid in the introduction of the tool 15 onto the piston-cylinder unit 1. The bevelled section 17 can preferably make a transition into a guide or centering section 19. A conical contour 21 is preferably adjacent to the centering section 19. This conical contour 21 can preferably perform the actual conical shaping of the edge 13. A central opening 23 can preferably serve as the passage for the piston rod 9. The conical tool 15 can have the general shape of a bell, and can be moved axially into the working position with respect to the piston-cylinder unit 1.

In accordance with one embodiment of the present invention, the centering section 19 can preferably have essentially the same dimensions as the cylinder 5 to fit about the cylinder 5 with minimal play. Thus, the centering section 19 can thereby essentially serve to enter the piston-cylinder unit 1 within the tool 15. Thus, the inside diameter of the centering section 19 can preferably be substantially the same as the outside diameter of the cylinder 5.

By means of the axial movement of the tool 15, preferably towards the piston-cylinder unit 1, and the subsequent transformation of the edge 13 into the general shape of a truncated cone, a sealing edge 25 can preferably be created. The axial movement of the tool 15 can, in accordance with at least one embodiment of the present invention, be a hammering force. The sealing edge 25 can preferably be independent of the length tolerances (or cutting lengths) [delta]L1 of the pressure tube 7, [delta]L2 of the piston rod guide 3, and [delta]L3 of the cylinder 5. The sealing edge 25 can preferably be positioned axially by a maximum of [delta]S/2, depending on the interaction of the individual length tolerances, without thereby exerting any disadvantageous influence.

In other words, and in accordance with at least one embodiment of the present invention, the sealing edge 25 can preferably be positioned axially by a maximum of [delta]S/2, depending on the interaction of the individual length tolerances.

In an additional process step, and in accordance with at least one embodiment of the present invention, at least one finger-like beading die 27 can preferably be driven, from radially outside the edge 13, into the edge 13, which edge 13 is already preferably in the shape of a truncated cone 14. Thus, partial closure surfaces 29 can preferably be formed. In accordance with one embodiment of the present invention, the partial closure surfaces 29 can be considered to be a first plurality of projections. These partial closure surfaces 29 can preferably be distributed over the transformed sections. In other words, the beading die 27 can be applied from radially outside the edge 13 and can "bend" or "fold" selected sections of the edge 13 downward at selected positions about the circumference of cylinder 5. In accordance with at least one embodiment of the present invention, the sections of the edge 13 can preferably be "bent" downward at an angle (b) (see FIG. 1a), which angle (b) can have a value of about 90°, so as to be disposed substantially perpendicular to the piston rod 9. Further, the beading die 27 can preferably determine the width of the closure surfaces 29.

In accordance with at least one embodiment of the present invention, partial closure surfaces 29 can preferably serve to brace the gasket 11 and the piston rod guide 3 within the cylinder 5, and preferably against one another. Further, there can preferably be eight partial closure surfaces 29 about the circumference of the cylinder 5. Of course, the number of partial closure surfaces 29 may be varied depending upon operational conditions and other factors.

The beading die 27 can preferably be in the form of radially adjustable tools, as shown in FIGS. 1 and 1a, or could also be in the form of a beading die 27a which can be moved axially, similar to the conical tool 15. The beading die 27a is shown in cross section in FIG. 2a. Thus, in accordance with one embodiment of the present invention, the axis of the beading die 27a shown in FIG. 2a can preferably be axially aligned with the axis of the piston-cylinder unit 1 shown in FIGS. 1 and 1a. In order to transform the edge 13, the beading die 27a can preferably have several finger-like structures 27b on its inside diameter. Essentially crack-free transitions 33 can preferably be formed between the closing surfaces 29 and the individual truncated cone surfaces 31. In accordance with one embodiment of the present invention, the truncated cone surfaces 31 can be considered to be a second plurality of projections. The transitions 33 can provide a high degree of reinforcement for the closing of the piston-cylinder unit 1.

Thus, in summary, and in accordance with at least one embodiment of the present invention, the piston-cylinder unit 1 can preferably be placed in a fixture which preferably holds the unit 1 in a stationary position, perhaps as part of a factory assembly line. The tool 15 can then be used to transform the edge 13 into the general shape of a truncated cone. Then, either beading die 27 applied radially to the edge 13, or beading die 27a applied axially to the edge 13, can preferably be used to create the partial closure surfaces In accordance with one embodiment of the present invention, each of the partial closure surfaces 29 can preferably have a base portion 29a (see FIG. 1a), and each of the truncated cone surfaces 31 can preferably have a base portion 31a (see FIG. 1a). These base portions 29a and 31a can preferably lie along or coincide with the continuous sealing edge 25 mentioned hereinabove.

For materials which may be particularly difficult to shape, the edge 13 of the piston-cylinder unit 1 could preferably be annealed in a prior process step, that is, before any shaping of edge 13 is attempted. In accordance with at least one embodiment of the present invention, as shown in FIG. 1a, the edge 13 can be heated with a heating instrument 13a, which heating instrument 13a, for example, could be a propane torch. In accordance with an additional embodiment of the present invention, in order to avoid possible melting of the gasket 11 by the treating of the edge 13, the edge 13 could be treated prior to the assembly of the gasket 11, and possibly other components.

Of course, other methods of treating edge 13 would be within the scope of the present invention, such as annealing by induction or other methods which can localize the treated area so that other components, such as gasket 11, are essentially not effected by the treating.

Figure 2A:
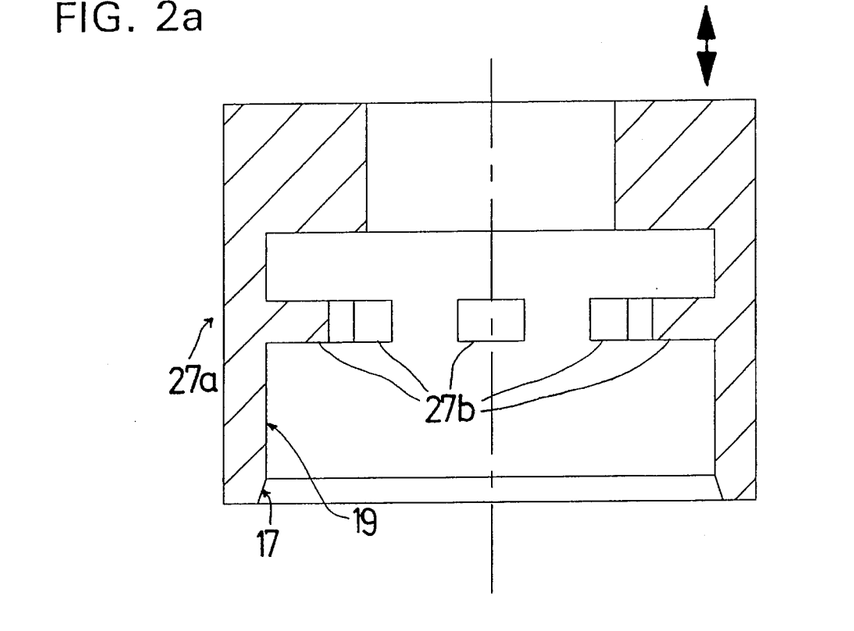
FIG. 2a shows cross-section of one embodiment of beading die.
Figure 2B:
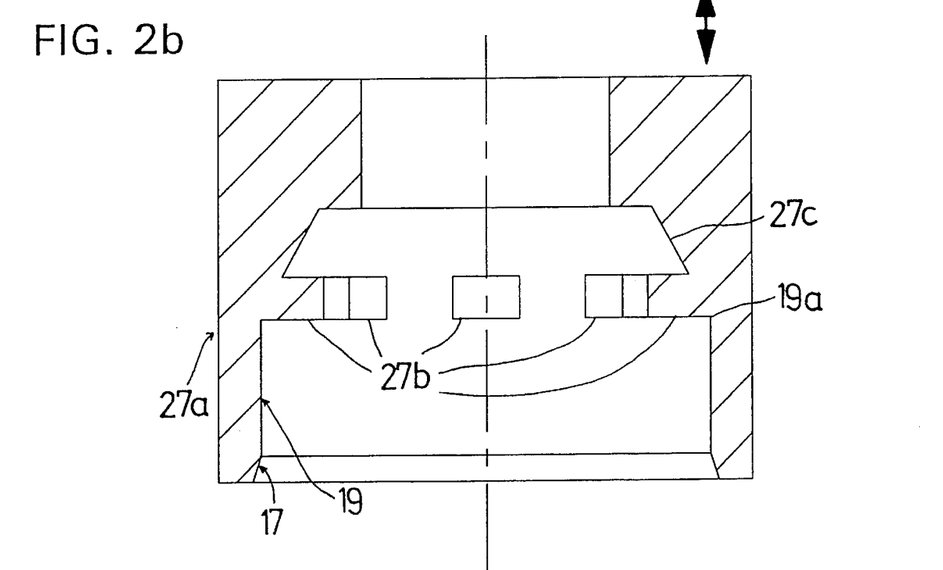
FIG. 2b shows an example of a combination tool.

FIG. 2b illustrates a variation of the beading die 27a shown in FIG. 2a which could, in accordance with one embodiment of the present invention, be used to transform edge 13 into a truncated cone 14, and also to create the partial closure surfaces 29. The beading die 27a shown in FIG. 2b can have a conically contoured portion or portions 27c which can be used to transform the edge 13 into the shape of a truncated cone 14. However, in contrast to the embodiments described hereinabove, this beading die 27a shown in FIG. 2b can preferably simultaneously transform the edge 13 into the truncated cone 14 and also "bend" portions of edge 13 to form the partial closure surfaces 29. The contoured portions 27c can preferably be disposed between the finger-like structures 27b and can preferably extend to a point 19a where centering section 19 preferably begins. The full extent of the contoured portion or portions 27c essentially cannot be seen in FIG. 2b due to the particular point at which the cross-section is taken.

In accordance with an alternative embodiment of the present invention, preferably before assembly of the piston-cylinder unit 1, the edge 13 of the cylinder 5 could be cut to remove portions of the edge 13 to form transition surfaces 33. Thus, portions preferably in the form of truncated cones could be cut out from edge 13. The portions of the edge 13 which are disposed between the cut out portions could then be "bent" over against gasket 11 and piston rod guide 3. Thus, essentially no portions of the edge 13 would be left protruding, as is the case with the embodiments of the present invention described hereinabove.

In accordance with yet an additional embodiment of the present invention, portions along the circumference of the edge 13 could be pre-cut in a vertical fashion, and the portions between the "cuts" could be "bent" or "folded" over against the gasket 11 and piston rod guide 3. Thus, it is conceivable that the beading die 27a shown FIG. 2a, and possibly FIG. 2b, could be a "cutter" with cutting portions 27b. Thus, when beading die 27a is lowered onto the piston-cylinder unit 1, cutting portions 27b could cut the edge 13 along the circumference of the edge 13 and the areas between the "cuts" could then be "folded" or "bent" downward.

Figure 3:
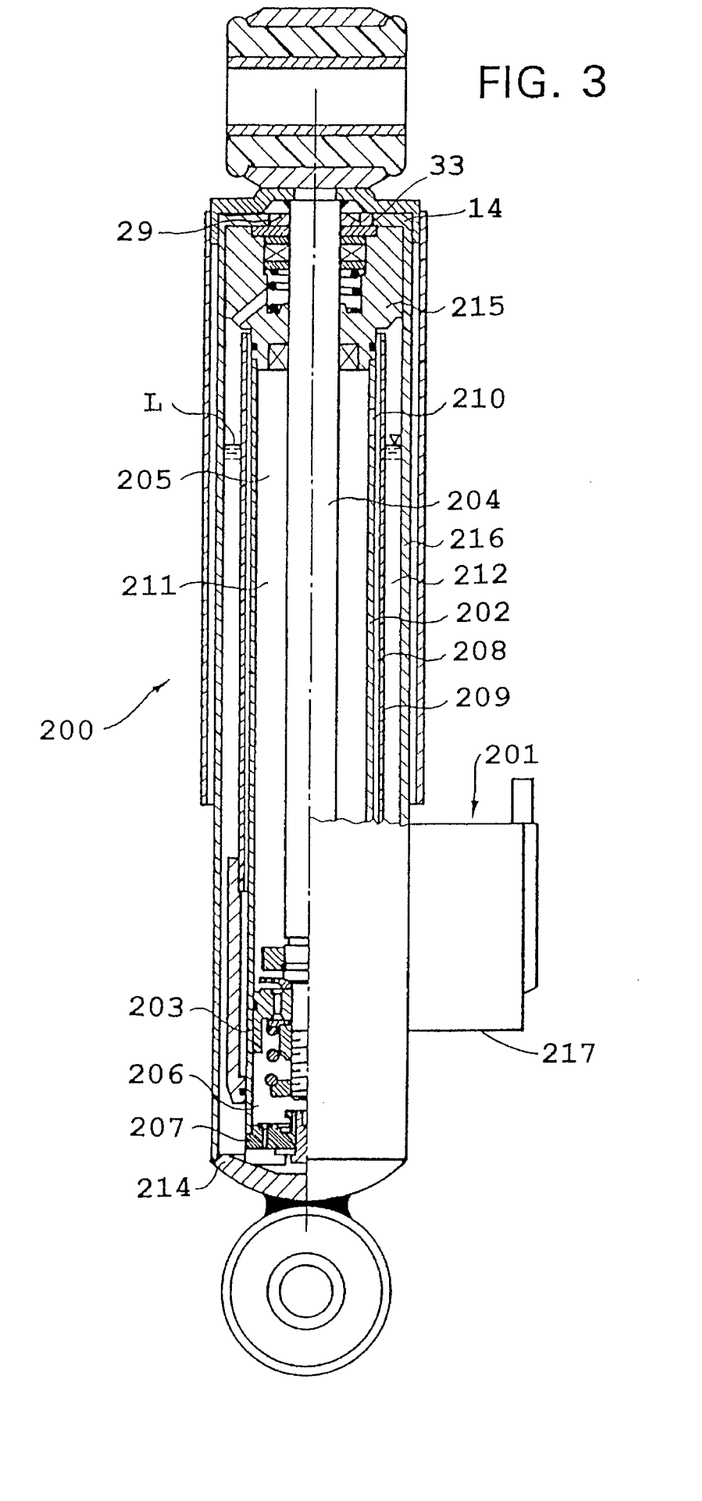
FIGS. 3 and 4 show a complete shock absorber assembly.
Figure 4:
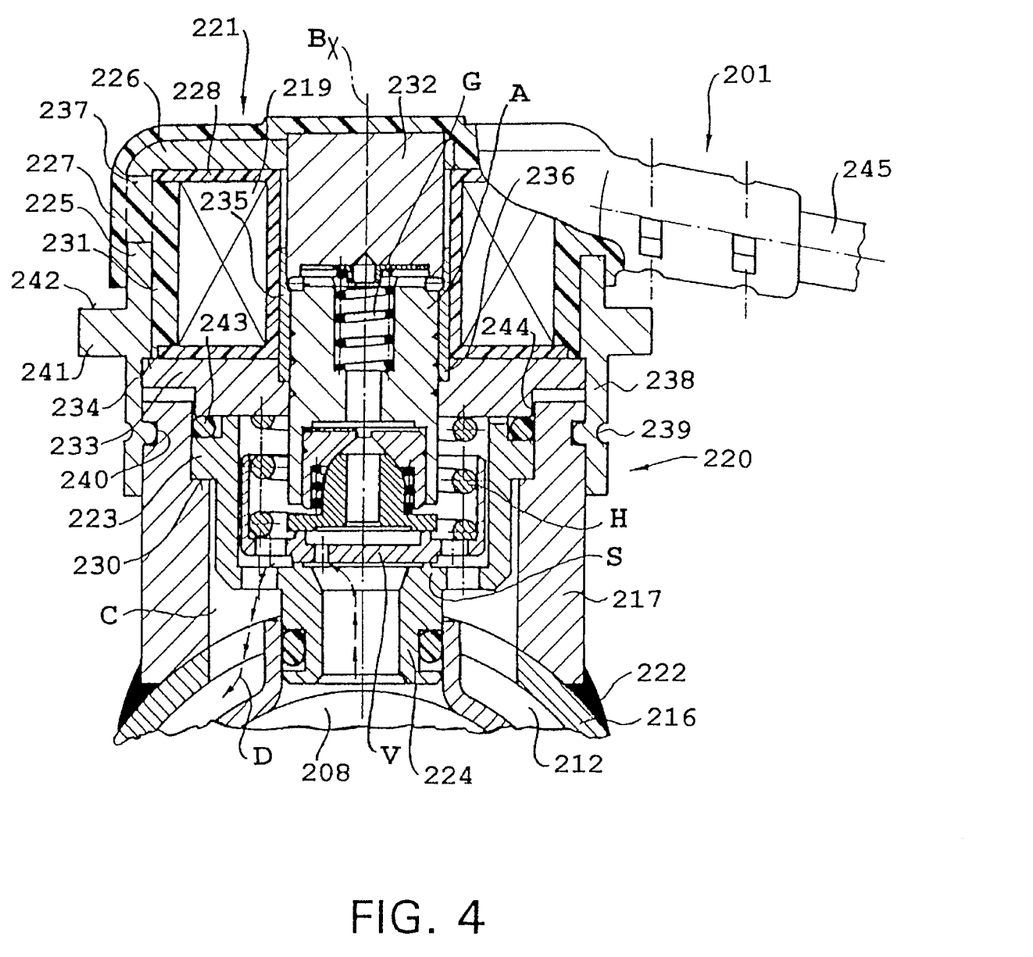

FIGS. 3 and 4 show a typical shock absorber or vibration damper in which the embodiments of the present invention may conceivably be incorporated. It should be understood that components found hereinbelow may be considered to be interchangeable with similar components discussed hereinabove with reference to FIG. 1.

FIG. 3 shows a complete shock absorber or oscillation damper 200, a detailed illustration of the valve unit 201 being omitted for the sake of clarity. The oscillation damper 200 can preferably be closed in accordance with the method and apparatus' described above with reference to FIGS. 1 through 2b. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating cheer 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211.

According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working cheer 206 and also within the upper working chamber 211.

By the connecting orifice 210 and the fluid path 208 the upper working chamber 211 is connected with the compensating chamber 212 via the valve unit 201. This is shown in more detail in FIG. 4, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pips 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 4 one can again see the fluid path 208 and the compensating chamber 212, which are interconnectable through the valve unit 201. The fluid path 208 is connected to the upper working chamber 211 as shown in FIG. 3. The flow direction from the fluid path 208 to the compensating chamber 212 across the valve unit 201 is indicated in FIG. 4 by the dotted line D provided with arrows indicating the flow direction both for inward movement and outward movement of the piston rod 204 with respect to the pressure pipe 202. One can lee in FIG. 4 a valve member V which can be lifted with respect to a valve seat S, such as to open the flow path D from the fluid path 208 to the compensating chamber 212.

For explaining the principles of the embodiment of the present invention shown in FIGS. 3 and 4, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located an a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 4 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is comprehend between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that essentially no play can occur.

One feature of the invention resides broadly in the piston-cylinder unit, in particular a shock absorber, which consists of a cylinder tube in which there is an axially movable piston rod, whereby the piston rod is guided by means of a piston rod guide with a seal which closes the cylinder tube, whereby a closing tool beads en edge which projects beyond the piston rod guide, characterized by the fact that the cylinder tube 5 has en edge 13 in the shape of a truncated cone which encircles the piston rod guide 3, which edge 13 is divided into individual truncated cone surfaces 31 by means of partial closure surfaces 29.

Another feature of the invention resides broadly in the piston-cylinder unit characterized by the fact that the truncated cone 14 forms a sealing edge 25 which encircles the piston rod guide 3.

Yet another feature of the invention resides broadly in the piston-cylinder unit characterized by the fact that there are transitions 33 between the closing surfaces 29 and the individual truncated cone surfaces 31.

Still another feature of the invention resides broadly in the piston-cylinder unit characterized by the fact that the cylinder tube 5 has a constant wall thickness.

A further feature of the invention resides broadly in the process for the manufacture of a piston-cylinder unit characterized by the fact that a conical tool or die 15 transforms the edge 13 of the cylinder tube 5 into a truncated cone 14, into which edge (13) subsequently at least one beading die or punch 27 is driven, so that partial closing surfaces 29 are created.

Another feature of the invention resides broadly in the process characterized by the fact that the edge 13 of the cylinder tube 5 is annealed in a prior processing step.

Yet another feature of the invention resides broadly in the apparatus for a process characterized by the fact that the conical tool 15 is formed by an axially adjustable bell, the shaping surfaces 21 of which have a conical contour.

Examples of dies which may be used in accordance with the present invention may be disclosed in the following U.S. patent: U.S. Pat. No. 5,226,306 to Yoshino et al. on Jul. 13, 1993, entitled "Bead Forming Metal Die for Forming Metal Gasket".

Examples of automatic machines which may be used in accordance with the present invention may be disclosed in the following U.S. patents: U.S. Pat. No. 5,186,037 to Bihler on Feb. 16, 1993, entitled "Processing Machine, Especially Automatic Punching and Bending Machine"; U.S. Pat. No. 5,221,884 to Teshima on Jun. 22, 1993, entitled "Numerical Control Apparatus"; and U.S. Pat. No. 5,239,478 to Yamamoto et al. on Aug. 24, 1993, entitled "Method Determining Groove Machine Process Based on Numerical Control Information Generating Function".

Examples of shock absorber assemblies and components associated therewith, including damping valves in pistons of shock absorbers, which may be utilized in accordance with the embodiments of the present invention, may be found in the following U.S. patents: U.S. Pat. No. 4,986,393, which issued to Preukschat et al. on Jan. 22, 1991; U.S. Pat. No. 4,749,070, which issued to Moser et al. on Jun. 7, 1988; and U.S. Pat. No. 4,723,640, which issued to Beck on Feb. 9, 1988.

Examples of shock absorber assemblies which may be utilized in accordance with the present invention may be disclosed in the following U.S. patents: U.S. Pat. No. 4,838,393 to Mourray et al. on Jun. 13, 1989, entitled "Hydro-mechanical Stop Having a Restrictive Passage"; U.S. Pat. No. 4,817,928, to Paton on Apr. 4, 1989, entitled "Suspension System"; U.S. Pat. No. 4,527,674 to Mourray on Jul. 9, 1985, entitled "Shock Absorber With a Hydromechanical Stop"; and U.S. Pat. No. 4,749,069 to Knecht et al. on Jun. 7, 1988, entitled "Vibration Damper for Motor Vehicles Having an Arrangement for Varying Damping Thereof".

Examples of methods of treating the edge of the piston-cylinder unit of the present invention may be disclosed in the following U.S. patent: U.S. Pat. No. 5,214,258 to Akers on May 25, 1993, entitled "Apparatus and Method of Ultra Rapid Annealing by Induction Heating of Thin Steel Strip".

All, or substantially all, of the components and methods of the various embodiments may be used with at least one embodiment or all of the embodiments, if more than one embodiment is described herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for a motor vehicle, said shock absorber comprising:

a cylinder defining a chamber therein, said cylinder containing a damping fluid;

a piston rod sealingly projecting into said cylinder and being axially displaceable within said cylinder, said piston rod having a longitudinal axis;

a piston being attached to said piston rod, said piston being slidably disposed within said cylinder to sealingly divide said chamber into first and second chambers;

means for permitting fluid communication between said first chamber and said second chamber;

a first end and a second end;

said cylinder being disposed between said first end and said second end;

said first end comprising first means for connecting said shock absorber to a first body;

said second end comprising second means for connecting said shock absorber to a second body;

said cylinder comprising:

a first end and a second end, said piston rod sealingly projecting into said first end of said cylinder;

means for closing said first end of said cylinder;

said closing means comprising a portion of said first end of said cylinder;

said portion of said first end of said cylinder comprising:

a first plurality of projections, each one of said first plurality of projections being oriented to extend towards said piston rod and substantially perpendicular to said longitudinal axis of said piston rod;

a second plurality of projections, each one of said second plurality of projections having a surface which lies on a truncated cone;

each one of said second plurality of projections being disposed between two adjacent ones of said first plurality of projections; and said first plurality of projections and said second plurality of projections enabling said cylinder to have a constant thickness.

2. The shock absorber according to claim 1 wherein said portion of said first end of said cylinder further comprises:

a plurality of transition surfaces;

each one of said plurality of transition surfaces extending between one of said plurality of first projections and an adjacent one of said plurality of second projections; and each one of said plurality of transition surfaces comprising a substantially sloped portion to effect a transition between each one of said plurality of first projections and adjacent ones of said plurality of second projections.

3. The shock absorber according to claim 2 wherein each of said surfaces of said second plurality of projections have a substantially conical portion.

4. The shock absorber according to claim 3 wherein said shock absorber further comprises:

means for sealing said first end of said cylinder;

said sealing means being disposed within said cylinder at said first end of said cylinder;

said first plurality of projections are disposed to hold said sealing means within said cylinder;

said first plurality of projections and said second plurality of projections each comprise a base portion disposed adjacent said sealing means; and each of said base portions together comprise a substantially continuous edge portion disposed about said sealing means, said substantially continuous edge portion for holding said sealing means within said cylinder.

5. The shock absorber according to claim 4 wherein said cylinder comprises:

wall means, said wall means comprising:

an interior surface portion and an exterior surface portion, said interior surface portion and said exterior surface portion being disposed to face away from one another; and said wall means having a thickness dimension defined between said interior surface portion and said exterior surface portion, said thickness dimension being substantially constant throughout substantially all portions of said wall means.

6. The shook absorber according to claim 5 wherein said shock absorber further comprises:

means for guiding said piston rod within said first end of said cylinder;

said guiding means being disposed substantially immediately adjacent said sealing means; and said edge portion being disposed substantially concentrically about said guiding means.

7. A method of making the shock absorber according to claim 6 wherein said method comprises the steps of:

annealing said portion of said first end of said cylinder to impart flexibility to said portion of said first end of said cylinder;

bending said portion of said first end of said cylinder towards said piston rod to form a substantially conical portion, said substantially conical portion having a surface which lies on a truncated cone; and further bending selected portions of said substantially conical portion towards said piston rod to form said first plurality of projections and said second plurality of projections.

8. The shock absorber according to claim 7 wherein:

said sealing means comprises a gasket disposed about said piston rod, said gasket having a ring shape;

said guiding means comprises a hole, said piston rod being disposed within said hole;

said guiding means extends substantially between said interior surface portion of said wall means and said piston rod;

said portion of said first end of said cylinder is disposed substantially concentrically about said guiding means;

each one of said second plurality of projections is disposed at an angle of about 30° with respect to said exterior surface portion of said wall means;

each one of said first plurality of projections is disposed at an angle of about 90° with respect to said exterior surface portion of said wall means;

each one of said second plurality of projections extends axially beyond said sealing means and said guiding means;

said cylinder further comprises:
a pressure tube disposed both within said cylinder and about said piston rod;
said pressure tube defining said chamber and containing the damping fluid;

said step of bending said portion of said first end of said cylinder to form said substantially conical portion further comprises:

bending said portion of said first end of said cylinder to form said substantially conical portion by means of a first tool;

said first tool comprising:
an interior surface portion and an exterior surface portion disposed to face away from one another;
a first end and a second end;
first means for receiving said piston rod, said receiving means being disposed at said first end;
at least one substantially conical surface portion disposed at said interior surface portion of said first tool and between said first and second ends of said first tool;
second means for receiving said said shock absorber, said second receiving means being disposed at said second end of said first tool;
at least a portion of said first tool having the general shape of a bell; and
means for permitting axial displacement of said first tool;

said step of further bending portions of said substantially conical portion to form said first plurality of projections and said second plurality of projections further comprises:

further bending portions of said substantially conical portion to form said first plurality of projections and said second plurality of projections by means of one of the following media a) and b):
a) a second tool, said second tool comprising a radially adjustable beading die; and
b) a second tool, said second tool comprising:
a first end and a second end;
an interior surface portion and an exterior surface portion disposed to face away from one another;
first means for receiving said piston rod, said first receiving means being disposed at said first end of said second tool;
a plurality of projections extending radially outwardly from said interior surface portion of said second tool;
a plurality of spaces, each of said plurality of spaces being disposed between adjacent ones of said plurality of projections;
second means for receiving said shock absorber, said second receiving means being disposed at said second end of said second tool; and
means for permitting axial displacement of said second tool;

said first end of said shock absorber is disposed adjacent said first end of said cylinder;

said second end of said shock absorber is disposed adjacent said second end of said cylinder;

said first plurality of projections comprises eight projections;

said shock absorber further comprising:
bottom valve means disposed at said second end of said shock absorber;
said bottom valve means having means for closing said pressure tube; and check valve means disposed near said second end of said cylinder.

9. A shock absorber for a motor vehicle, said shock absorber comprising:

a cylinder defining a chamber therein, said cylinder containing a damping fluid;

a piston rod sealingly projecting into said cylinder and being axially displaceable within said cylinder, said piston rod having a longitudinal axis;

a piston being attached to said piston rod, said piston being slidably disposed within said cylinder to sealingly divide said chamber into first and second chambers;

means for permitting fluid communication between said first chamber and said second chamber;

a first end and a second end;

said cylinder being disposed between said first end and said second end;

said first end comprising first means for connecting said shock absorber to a first body;

said second end comprising second means for connecting said shock absorber to a second body;

said cylinder comprising:
a first end and a second end, said piston rod sealingly projecting into said first end of said cylinder;
means for closing said first end of said cylinder;
said closing means comprising a portion of said first end of said cylinder;
said portion of said first end of said cylinder comprising:
a first plurality of projections, each one of said first plurality of projections being oriented to extend towards said piston rod and substantially perpendicular to said longitudinal axis of said piston rod;
a second plurality of projections, each one of said second plurality of projections having a surface which lies on a truncated cone, each of said surfaces having a substantially conical portion; and
each one of said second plurality of projections being disposed between two adjacent ones of said first plurality of projections.

10. The shock absorber according to claim 9 wherein said portion of said first end of said cylinder further comprises:

a plurality of transition surfaces;

each one of said plurality of transition surfaces extending between one of said plurality of first projections and an adjacent one of said plurality of second projections; and each one of said plurality of transition surfaces comprising a substantially sloped portion to effect a transition between each one of said plurality of first projections and adjacent ones of said plurality of second projections.

11. The shock absorber according to claim 10 wherein said first plurality of projections and said second plurality of projections enable said cylinder to have a constant thickness.

12. The shock absorber according to claim 11 wherein said shock absorber further comprises:

means for sealing said first end of said cylinder;

said sealing means being disposed within said cylinder at said first end of said cylinder; and said first plurality of projections are disposed to hold said sealing means within said cylinder.

13. The shock absorber according to claim 12 wherein:

said first plurality of projections and said second plurality of projections each comprise a base portion disposed adjacent said sealing means;

each of said base portions together comprise a substantially continuous edge portion disposed about said sealing means, said substantially continuous edge portion for holding said sealing means within said cylinder;

said cylinder comprises:

wall means, said wall means comprising:

an interior surface portion and an exterior surface portion, said interior surface portion and said exterior surface portion being disposed to face away from one another;

said wall means having a thickness dimension defined between said interior surface portion and said exterior surface portion, said thickness dimension being substantially constant throughout substantially all portions of said wall means;

said shock absorber further comprises:

means for guiding said piston rod within said first end of said cylinder;

said guiding means being disposed substantially immediately adjacent said sealing means; and said edge portion being disposed substantially concentrically about said guiding means.

14. A method of making the shock absorber according to claim 13, said method comprising the steps of:

annealing said portion of said first end of said cylinder to impart flexibility to said portion of said first end of said cylinder;

bending said portion of said first end of said cylinder towards said piston rod to form a substantially conical portion, said substantially conical portion having a surface which lies on a truncated cone; and further bending selected portions of said substantially conical portion towards said piston rod to form said first plurality of projections and said second plurality of projections.

15. The shock absorber according to claim 14 wherein:

said sealing means comprises a gasket disposed about said piston rod, said gasket having a ring shape;

said guiding means comprises a hole, said piston rod being disposed within said hole;

said guiding means extends substantially between said interior surface portion of said wall means and said piston rod;

said portion of said first end of said cylinder is disposed substantially concentrically about said guiding means;

each one of said second plurality of projections is disposed at an angle of about 30° with respect to said exterior surface portion of said wall means;

each one of said first plurality of projections is disposed at an angle of about 90° with respect to said exterior surface portion of said wall means;

each one of said second plurality of projections extends axially beyond said sealing means and said guiding means;

said cylinder further comprises:

a pressure tube disposed both within said cylinder and about said piston rod;

said pressure tube defining said chamber and containing the damping fluid;

said step of bending said portion of said first end of said cylinder to form said substantially conical portion further comprises:

bending said portion of said first end of said cylinder to form said substantially conical portion by means of a first tool;

said first tool comprising:

an interior surface portion and an exterior surface portion disposed to face away from one another;

a first end and a second end;

first means for receiving said piston rod, said receiving means being disposed at said first end;

at least one substantially conical surface portion disposed at said interior surface portion of said first tool and between said first and second ends of said first tool;

second means for receiving said said shock absorber, said second receiving means being disposed at said second end of said first tool;

at least a portion of said first tool having the general shape of a bell; and means for permitting axial displacement of said first tool;

said step of further bending portions of said substantially conical portion to form said first plurality of projections and said second plurality of projections further comprises:

further bending portions of said substantially conical portion to form said first plurality of projections and said second plurality of projections by means of one of the following media a) and b):

a) a second tool, said second tool comprising a radially adjustable beading die; and b) a second tool, said second tool comprising:

a first end and a second end;

an interior surface portion and an exterior surface portion disposed to face away from one another;

first means for receiving said piston rod, said first receiving means being disposed at said first end of said second tool;

a plurality of projections extending radially outwardly from said interior surface portion of said second tool;

a plurality of spaces, each of said plurality of spaces being disposed between adjacent ones of said plurality of projections;

second means for receiving said shock absorber, said second receiving means being disposed at said second end of said second tool; and means for permitting axial displacement of said second tool;

said first end of said shock absorber is disposed adjacent said first end of said cylinder;

said second end of said shock absorber is disposed adjacent said second end of said cylinder;

said first plurality of projections comprises eight projections;

said shock absorber further comprising:
  bottom valve means disposed at said second end of said shock absorber;
  said bottom valve means having means for closing said pressure tube; and
  check valve means disposed near said second end of said cylinder.

16. A method of making a shock absorber for a motor vehicle, said shock absorber comprising: a cylinder defining a chamber therein, said cylinder containing a damping fluid; a piston rod sealingly projecting into said cylinder and being axially displaceable within said cylinder, said piston rod having a longitudinal axis; a piston being attached to said piston rod, said piston being slidably disposed within said cylinder to sealingly divide said chamber into first and second chambers; means for permitting fluid communication between said first chamber and said second chamber; a first end and a second end; said cylinder being disposed between said first end and said second end; said first end comprising first means for connecting said shock absorber to a first body; said second end comprising second means for connecting said shock absorber to a second body; said cylinder comprising: a first end and a second end, said piston rod sealingly projecting into said first end of said cylinder; means for closing said first end of said cylinder; said closing means comprising a portion of said first end of said cylinder; said portion of said first end of said cylinder comprising: a first plurality of projections, each one of said first plurality of projections being oriented to extend towards said piston rod and substantially perpendicular to said longitudinal axis of said piston rod; a second plurality of projections, each one of said second plurality of projections having a surface which lies on a truncated cone, each of said surfaces having a substantially conical portion; and each one of said second plurality of projections being disposed between two adjacent ones of said first plurality of projections;

said method comprising the steps of:
  providing a cylinder defining a chamber therein and having a first end and a second end;
  providing a piston rod having a longitudinal axis;
  providing a piston;
  providing means for permitting fluid communication;
  providing first means for connecting said shock absorber to a first body;
  providing second means for connecting said shock absorber to a second body;

said method further comprising the steps of:
  adding damping fluid to said chamber of said cylinder;
  disposing said piston rod in said first end of said cylinder such that said piston rod sealingly projects into said cylinder and is axially displaceable within said cylinder;
  attaching said piston to said piston rod and slidably disposing said piston within said cylinder to sealingly divide said chamber of said cylinder into first and second chambers;
  closing said first end of said cylinder and forming said closing means, by the following steps:
    bending said portion of said first end of said cylinder towards said piston rod to form a substantially conical portion having a surface which lies on a truncated cone;
    further bending portions of said substantially conical portion to form a first plurality of projections being bent substantially perpendicular to said longitudinal axis of said piston rod, said first plurality of projections extending towards said piston rod;
    said step of further bending providing a second plurality of projections, each of said second plurality of projections having a surface which lies on a truncated cone, each of said surfaces having a substantially conical portion; and
    each of said second plurality of projections being disposed between two adjacent ones of said first plurality of projections.

17. The method according to claim 16 wherein said step of further bending said substantially conical portion to form said first plurality of projections and said second plurality of projections enables said cylinder to have a constant thickness.

18. The method according to claim 17 wherein said step of further bending portions of said substantially conical portion to form said first plurality of projections and said second plurality of projections further comprises:
  forming a plurality of transition surfaces, each one of said plurality of transition surfaces extending between one of said plurality of first projections and an adjacent one of said plurality of second projections; and
  said step of forming said plurality of transition surfaces further comprises forming a substantially sloped portion to effect a transition between each of said plurality of first projections and adjacent ones of said plurality of second projections.

19. The method according to claim 18, further comprising:
  providing means for sealing said first end of said cylinder;
  disposing said sealing means within said cylinder at said first end of said cylinder;
  said first plurality of projections being bent to be disposed to hold said sealing means within said cylinder;
  said step of further bending further comprises forming a base portion of each one of said first plurality of projections and each one of said second plurality of projections, said base portions being disposed adjacent said sealing means;
  said step of forming said base portions further comprises forming a substantially continuous edge portion disposed about said sealing means, said substantially continuous edge portion for holding said sealing means within said cylinder;
  configuring said cylinder to comprise wall means having an interior surface portion and an exterior surface portion;
  disposing said interior surface portion and said exterior surface to face away from one another;
  configuring said wall means to have a thickness dimension defined between said interior surface portion and said exterior surface portion, said thickness dimension being substantially constant throughout substantially all portions of said wall means;
  providing means for guiding said piston rod within said first end of said cylinder;
  disposing said guiding means substantially immediately adjacent said sealing means; and
  disposing said edge portion substantially concentrically about said guiding means.

20. The method according to claim 19, further comprising:
  annealing said portion of said first end of said cylinder to impart flexibility to said portion of said first end of said cylinder, said annealing having been performed prior to said step of bending said portion of said first end of said cylinder to form said substantially conical portion;

said step of bending said portion of said first end of said cylinder to form said substantially conical portion further comprises:

bending said portion of said first end of said cylinder, to form said substantially conical portion by means of a first tool;

said first tool comprising:
- an interior surface portion and an exterior surface portion disposed to face away from one another;
- a first end and a second end;
- first means for receiving said piston rod, said receiving means being disposed at said first end;
- at least one substantially conical surface portion disposed at said interior surface portion of said first tool and between said first and second ends of said first tool;
- second means for receiving said shock absorber, said second receiving means being disposed at said second end of said first tool;
- at least a portion of said first tool having the general shape of a bell; and
- means for permitting axial displacement of said first tool;

said step of further bending portions of said substantially conical portion to form said first plurality of projections and said second plurality of projections further comprises:

further bending portions of said substantially conical portion to form said first plurality of projections and said second plurality of projections by means of one of the following media a) and b):
- a) a second tool, said second tool comprising a radially adjustable beading die; and
- b) a second tool, said second tool comprising:
  - a first end and a second end;
  - an interior surface portion and an exterior surface portion disposed to face away from one another;
  - first means for receiving said piston rod, said first receiving means being disposed at said first end of said second tool;
  - a plurality of projections extending radially outwardly from said interior surface portion of said second tool;
  - a plurality of spaces, each of said plurality of spaces being disposed between adjacent ones of said plurality of projections;
  - second means for receiving said shock absorber, said second receiving means being disposed at said second end of said second tool; and
  - means for permitting axial displacement of said second tool;

configuring said sealing means to comprise a gasket having a ring shape;

disposing said gasket about said piston rod;

configuring said guiding means to comprise a hole;

disposing said piston rod within said hole;

configuring said guiding means to extend substantially between said interior surface portion of said wall means and said piston rod;

disposing said portion of said first end of said cylinder substantially concentrically about said guiding means;

disposing each one of said second plurality of projections at an angle of about 30° with respect to said exterior surface portion of said wall means;

disposing each one of said first plurality of projections at an angle of about 90° with respect to said exterior surface portion of said wall means;

configuring each one of said second plurality of projections to extend axially beyond said sealing means and said guiding means;

providing a pressure tube;

disposing said pressure tube both within said cylinder and about said piston rod, said pressure tube defining said chamber;

said step of adding damping fluid to said chamber further comprises adding damping fluid to said pressure tube;

disposing said first end of said shock absorber adjacent said first end of said cylinder;

disposing said second end of said shock absorber adjacent said second end of said cylinder;

said step of further bending portions of said substantially conical portion to form said first plurality of projections further comprises forming eight of said first plurality of projections;

providing bottom valve means;

disposing said bottom valve means at said second end of said shock absorber;

providing said bottom valve means with means for closing said pressure tube; and providing check valve means; and disposing said check valve means near said second end of said cylinder.

* * * * *

UNITED STATES PATENT AND TRADEMARK OFFICE
CERTIFICATE OF CORRECTION

PATENT NO. : 5,598,905
DATED : February 4, 1997
INVENTOR(S) : Werner RUDLOFF

It is certified that error appears in the above-indentified patent and that said Letters Patent is hereby corrected as shown below:

In column 3, line 59, after the second occurrence of 'of' insert --a--.

In column 4, line 8, after 'gasket' insert --11.--.

In column 7, line 20, after 'compensating', delete "cheer" and insert --chamber--.

In column 12, line 43, Claim 6, after 'The', delete "shook" and insert --shock--.

In column 13, line 38, Claim 8, after the first occurrence of 'said' delete the second occurrence of "said".

In column 16, line 31, Claim 15, after the first occurrence of 'said' delete the second occurrence of "said".

Signed and Sealed this

Third Day of June, 1997

BRUCE LEHMAN

Attest:

Attesting Officer

Commissioner of Patents and Trademarks